(12) United States Patent
Kato et al.

(10) Patent No.: US 10,035,395 B2
(45) Date of Patent: Jul. 31, 2018

(54) VEHICLE LEAF SPRING SHACKLE

(71) Applicants: HOSEI BRAKE INDUSTRY CO., LTD., Toyota-shi, Aichi (JP); TOYOTA JIDOSHA KABUSHIKI KAISHA, Toyota-shi, Aichi (JP)

(72) Inventors: Shinji Kato, Toyota (JP); Tomonori Ishigaki, Toyota (JP); Mamoru Saito, Toyota (JP)

(73) Assignees: HOSEI BRAKE IND. CO., LTD., Toyota-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/522,850

(22) PCT Filed: Nov. 9, 2015

(86) PCT No.: PCT/JP2015/081522
§ 371 (c)(1),
(2) Date: Apr. 28, 2017

(87) PCT Pub. No.: WO2016/076278
PCT Pub. Date: May 19, 2016

(65) Prior Publication Data
US 2017/0313150 A1  Nov. 2, 2017

(30) Foreign Application Priority Data

Nov. 11, 2014  (JP) .................................. 2014-229350

(51) Int. Cl.
*B60G 11/12* (2006.01)

(52) U.S. Cl.
CPC .... *B60G 11/12* (2013.01); *B60G 2206/82092* (2013.01)

(58) Field of Classification Search
CPC ....................... B60G 11/12; B60G 2206/82092
See application file for complete search history.

(56) References Cited

U.S. PATENT DOCUMENTS 1,827,234 A * 10/1931 Hughes .................. B60G 11/12
                                                    267/270
1,869,132 A *  7/1932 Chilton .................. B60G 11/12
                                                    267/269
(Continued)

FOREIGN PATENT DOCUMENTS

EP        1571013 A1     9/2005
JP      H06-227221 A     8/1994
(Continued)

OTHER PUBLICATIONS

Jan. 19, 2016 International Search Report issued in Patent Application No. PCT/JP2015/081522.

*Primary Examiner* — Faye M Fleming
(74) *Attorney, Agent, or Firm* — Oliff PLC

(57) ABSTRACT

A vehicle leaf spring shackle includes pair of longitudinal plate members opposed to each other, pair of devices for connecting the pair of longitudinal plate members to each other at their opposite end portions with respective predetermined spacing distances, and between pair of longitudinal plate members, one pair of devices is coupled to a member of a vehicle body while other pair of devices is coupled to one end portion of a leaf spring device provided to suspend the vehicle body. At least one end portion of the pair of longitudinal plate members on the leaf spring device side including a thick-walled portion formed with thickness larger than other portions of the pair of longitudinal plate members, the thick-walled portion is formed by press-forming operation to press at least one end portions of the longitudinal plate members on the leaf spring device side, in direction of the end portion plane.

4 Claims, 5 Drawing Sheets

(56) References Cited

U.S. PATENT DOCUMENTS

| | | | | |
|---|---|---|---|---|
| 1,916,077 A | * | 6/1933 | Schlatter | B60G 11/12 267/270 |
| 1,954,277 A | * | 4/1934 | Zerk | B60G 11/12 267/270 |
| 1,991,491 A | * | 2/1935 | Calkins | B60G 11/12 267/271 |
| 2,236,686 A | * | 4/1941 | Jackson | B60G 11/12 267/264 |
| 2,258,067 A | * | 10/1941 | Paton | B60G 9/00 267/269 |
| 3,030,101 A | | 4/1962 | Spring | |
| 7,669,867 B2 | * | 3/2010 | Kuraishi | B60G 11/12 267/269 |
| 2007/0262553 A1 | | 11/2007 | Kuraishi | |

FOREIGN PATENT DOCUMENTS

| | | |
|---|---|---|
| JP | H11-048739 A | 2/1999 |
| JP | 2007-137246 A | 6/2007 |
| JP | 2007-331742 A | 12/2007 |
| JP | 2010-158916 A | 7/2010 |

* cited by examiner

VEHICLE LEAF SPRING SHACKLE

TECHNICAL FIELD

The present invention relates to a shackle of a leaf spring device of a vehicle, and more particularly to a technique for reducing a cost of manufacture of the shackle as compared with that in the prior art.

BACKGROUND ART

There is known a vehicle leaf spring shackle which is provided with (a) a pair of longitudinal plate members opposed to each other and (b) a pair of connecting devices for connecting the pair of longitudinal plate members to each other at their opposite end portions with respective predetermined spacing distances therebetween, and (c) wherein between the pair of longitudinal plate members, one of the pair of connecting devices is coupled to a member of a body of a vehicle while the other of the pair of connecting devices is coupled to one end portion of a leaf spring device provided to suspend the body of the vehicle. Patent Document 1 discloses an example of such a vehicle leaf spring shackle.

PRIOR ART DOCUMENT

Patent Document 1: JP-06-227221 A1

SUMMARY OF THE INVENTION

Object Achieved by the Invention

By the way, to damp the vibrations (noises) around a vehicle suspension system provided with such a shackle, it has been considered to form a thick-walled portion 100a by welding a metal piece (mass) on a longitudinal plate member 100 provided in the shackle such that the thick-walled portion 100a has a larger thickness than that of the other portion of the longitudinal plate member 100, as shown in FIG. 6, or to form a longitudinal plate member 102 of the shackle by casting such that the longitudinal plate member 102 is formed with a thick-walled portion 102a having a larger thickness than that of the other portion of the longitudinal plate member 102, as shown in FIGS. 7 and 8.

However, the longitudinal plate member 100 provided with the thick-walled portion 100a formed by welding suffers from a problem of a comparatively high cost of manufacture of the shackle, namely, of the longitudinal plate member 100, which arises from a need of an additional part, that is, the thick-walled portion 100a in the form of the thick-walled metal piece (mass) which is formed by a comparatively costly welding process. On the other hand, the longitudinal plate member 102 provided with the thick-walled portion 102a formed by casting suffers from a problem of a comparatively high cost of manufacture of the shackle, namely, of the longitudinal plate member 102, which arises from a need of machining a surface of the longitudinal plate member 102, for example, a fixing surface thereof, to flatten the surface on which a raised or recessed portion 102b may be formed in the process of casting of the longitudinal plate member 102.

The present invention was made in view of the background art described above. It is therefore an object of the present invention to provide a shackle of a leaf spring device of a vehicle, the longitudinal plate members of which can be manufactured at a reduced cost as compared with that in the prior art.

Means for Achieving the Object

The object indicated above is achieved according to the principle of the present invention, which provides a vehicle leaf spring shackle (a) which is provided with a pair of longitudinal plate members opposed to each other, and a pair of connecting devices for connecting the pair of longitudinal plate members to each other at their opposite end portions with respective predetermined spacing distances therebetween, and wherein between the pair of longitudinal plate members, one of the pair of connecting devices is connected to a member of a body of a vehicle while the other of the pair of connecting devices is connected to one end portion of a leaf spring device provided to suspend the body of the vehicle, (b) wherein at least one of the end portions of the above-described pair of longitudinal plate members on the side of the above-described leaf spring device is provided with a thick-walled portion formed with a thickness larger than that of the other portions of the pair of longitudinal plate members, and (c) the thick-walled portion is formed by a press-forming operation to press the at least one of the end portions of the above-described longitudinal plate members on the side of the above-described leaf spring device, in a direction of plane of the end portion.

Advantages of the Invention

The vehicle leaf spring shackle constructed as described above is configured such that at least one of the end portions of the above-described pair of longitudinal plate members on the side of the above-described leaf spring device is provided with the thick-walled portion formed with the thickness larger than the thickness of the other portion of the longitudinal plate member, by the press-forming operation to press the end portion of the above-described longitudinal plate member in the direction of plane of this end portion. Accordingly, the above-described plate member having the thick-walled portion can be manufactured at a reduced cost than in the prior art, since the thick-walled portion is formed by the press-forming operation at a comparatively lower cost of manufacture, rather than by the comparatively costly welding or casting operation, for example.

MODE FOR CARRYING OUT THE INVENTION

Embodiments of this invention will be described in detail by reference to the drawings. It is to be understood that the drawings showing the embodiments are simplified or transformed for easier understanding, and that the drawings do not necessarily accurately represent the dimensions and shapes of the elements shown therein.

First Embodiment

Figure 1:
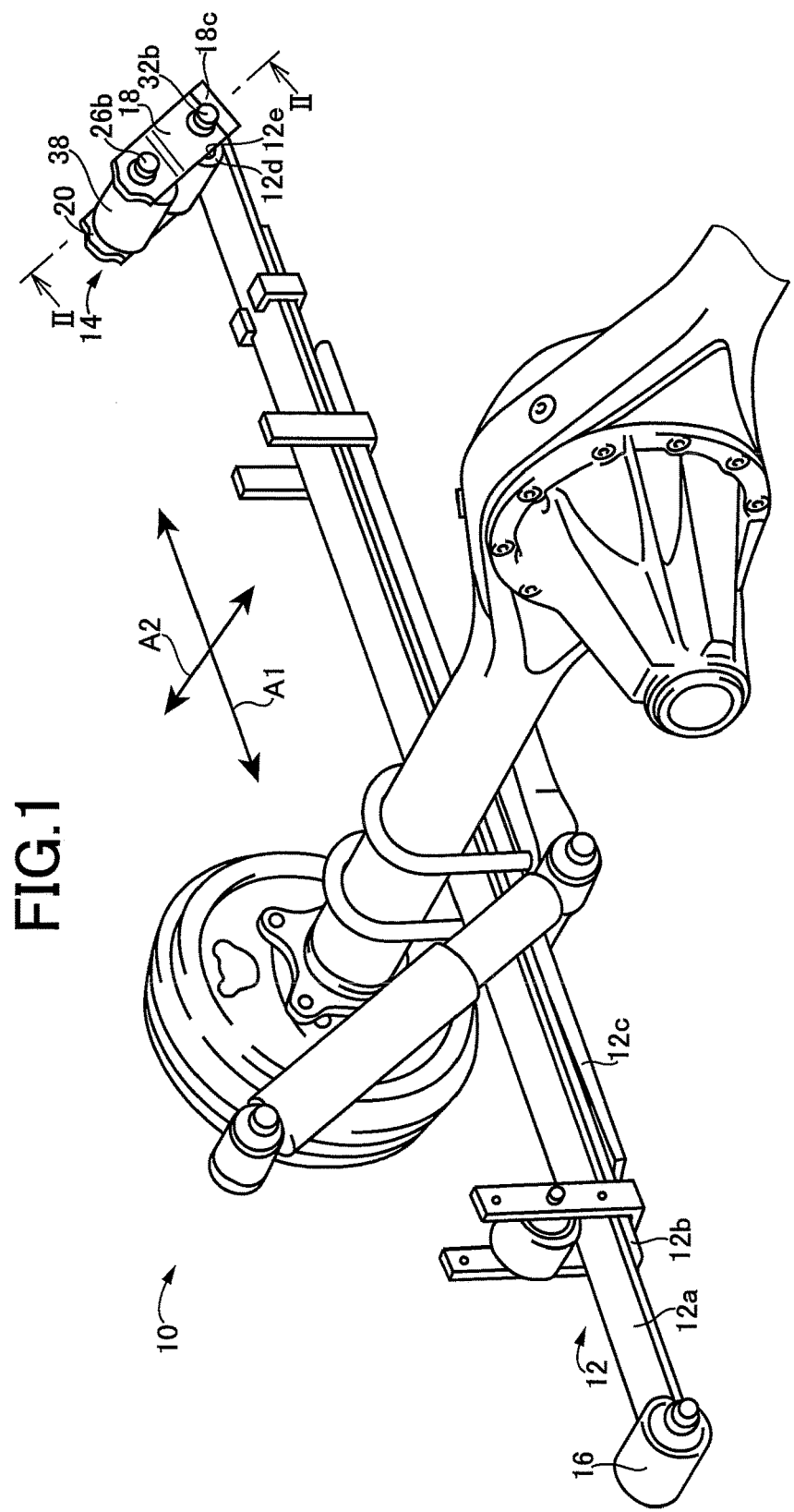
FIG. 1 is a perspective view showing a leaf spring type suspension according to one embodiment of this invention.

FIG. 1 is the perspective view showing a part of a leaf spring type suspension (hereinafter referred to as "suspension") 10 according to one embodiment of this invention. As shown in FIG. 1, the suspension 10 is of an axle-suspending type for suspending the axles of rear wheels of a vehicle. The suspension 10 has a pair of leaf spring devices (vehicle leaf spring devices) 12 which are disposed so as to expend in a longitudinal direction A1 of the vehicle and each of which consists of a plurality of leaf springs (three leaf springs in this embodiment) 12a, 12b and 12c which are superposed on each other. The suspension 10 is also provided with a first attaching device in the form of a shackle 14 and a second attaching device 16, which are disposed between respective opposite end portions of each leaf spring device 12 and a body member of the vehicle in the form of a side frame not shown, to attach the leaf spring device 12 to the side frame. It is noted that the vehicle body including the above-indicated side frame is suspended by the leaf spring devices 12 via the above-described first attaching device in the form of the shackle 14 and the second attaching device 16. It is also noted that one of the pair of leaf spring devices 12 is not shown in FIG. 1.

Figure 2:
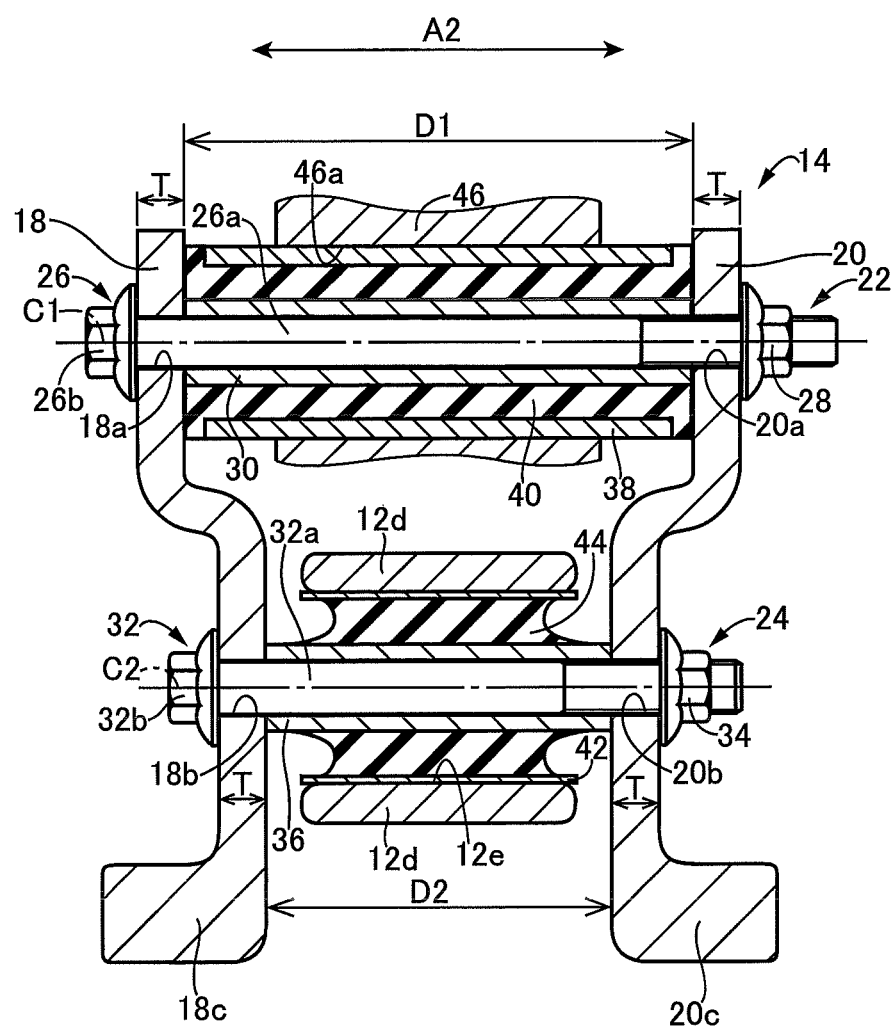
FIG. 2 is a cross sectional view taken in the direction of arrows II-II in FIG. 1, for explaining a structure of a shackle of the leaf spring type suspension of FIG. 1.

FIG. 2 is the cross sectional view taken in the direction of arrows II-II in FIG. 1, for explaining a structure of the shackle 14 shown in FIG. 1. As shown in FIG. 2, the shackle 14 is provided with a first longitudinal plate member (longitudinal plate member) 18 in the form of an elongate plate and a second longitudinal plate member (longitudinal plate member) 20 in the form of an elongate plate which are opposed to each other in a transverse direction A2 of the vehicle, and a first connecting device (connecting device) 22 and a second connecting device (connecting device) 24 for connecting the first and second longitudinal plate members 18 and 20 to each other at their opposite end portions with respective predetermined spacing distances therebetween in the transverse direction A2. It is noted that the end portion of the first longitudinal plate member 18 remote from the leaf spring device 12 and the end portion of the second longitudinal plate member 20 remote from the leaf spring device 12 are connected to each other by the first connecting device 22 with a first spacing distance (predetermined spacing distance) D1 in the transverse direction A2, while the end portion of the first longitudinal plate member 18 on the side of the leaf spring device 12 and the end portion of the second longitudinal plate member 20 on the side of the leaf spring device 12 are connected to each other by the second connecting device 24 with a second spacing distance (predetermined spacing distance) D2 in the transverse direction A2, which is smaller than the first spacing distance D1.

As shown in FIG. 2, the first connecting device 22 is provided with: a first bolt 26 having a stem portion 26a extending through first through-holes 18a and 20a formed through the end portions of the respective first and second longitudinal plate members 18 and 20 remote from the leaf spring device 12; a first nut 28 screwed on an end portion of the stem portion 26a remote from a head portion 26b; and a first spacer 30 in the form of a cylinder disposed radially outwardly of the stem portion 26a of the first bolt 26 between the first and second longitudinal plate members 18 and 20. On the other hand, the second connecting device 24 is provided with: a second bolt 32 having a stem portion 32a extending through second, through-holes 18b and 20b formed through the end portions of the respective first and second longitudinal plate members 18 and 20 on the side of the leaf spring device 12; a second nut 34 screwed on an end portion of the stem portion 32a remote from a head portion 32b; and a second spacer 36 in the form of a cylinder disposed radially outwardly of the stem portion 32a of the second bolt 32 between the first and second longitudinal plate members 18 and 20.

The first connecting device 22 and the second connecting device 24 which have the structures described above connect the first and second longitudinal plate members 18 and 20 to each other with the predetermined spacing distances therebetween, such that the opposite end portions of the first and second longitudinal plate members 18 and 20 are held in abutting contact with the opposite end portions of the first and second spacers 30 and 36, while the first and second nuts 28 and 34 are tightened.

As also shown in FIG. 2, the shackle 14 is provided with: a first cylindrical member 38 in the form of a cylinder disposed radially outwardly of the first spacer 30 of the first connecting device 22; a first vibration damping portion 40 formed of a synthetic rubber or other vibration damping material interposed between the first cylindrical member 38 and the first spacer 30; a second cylindrical member 42 in the form of a cylinder disposed radially outwardly of the second spacer 36 of the second connecting device 24; and a second vibration damping portion 44 formed of a synthetic rubber or other vibration damping material interposed between the second cylindrical member 42 and the second spacer 36.

As shown in FIG. 2, the shackle 14 is coupled to an attaching member (vehicle body member) 46 fixed to the above-described side frame, at its first cylindrical member 38 of the first connecting device 22, and is also coupled to one end portion of the leaf spring device 12 at its second cylindrical member 42 of the second connecting device 24, between the first and second longitudinal plate members 18 and 20. The above-indicated attaching member 46 having a fitting hole 46a is fitted on the first cylindrical member 38 such that the attaching member 46 and the first cylindrical member 38 are rotatable relative to each other about a first axis C1 of the first bolt 26, whereby the attaching member 46 is coupled to the first cylindrical member 38, namely, to the first connecting device 22. The longest leaf spring 12a (shown in FIG. 1) of the leaf spring device 12 has opposite annular end portions 12d in the form of rings, and each annular end portion 12d having a center hole 12e. One of the annular end portions 12d is fitted on the second cylindrical member 42 such that the annular end portion 12d and the second cylindrical member 42 are rotatable relative to each other about a second axis C2 of the second bolt 32, whereby the above-indicated annular end portion 12d is coupled to the second cylindrical member 42, namely, to the second connecting device 24.

Figure 6:
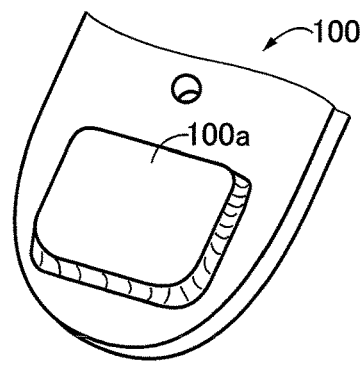
FIG. 6 is a view showing a thick-walled portion of the longitudinal plate member provided in the prior art shackle, which is formed by welding.
Figure 7:
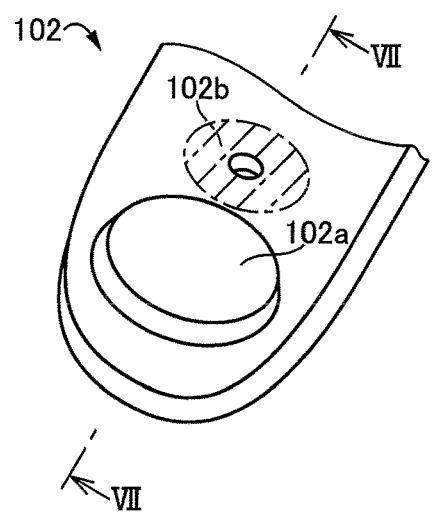
FIG. 7 is a view showing a thick-walled portion of the longitudinal plate member provided in the prior art shackle, which is formed by casting.
Figure 8:
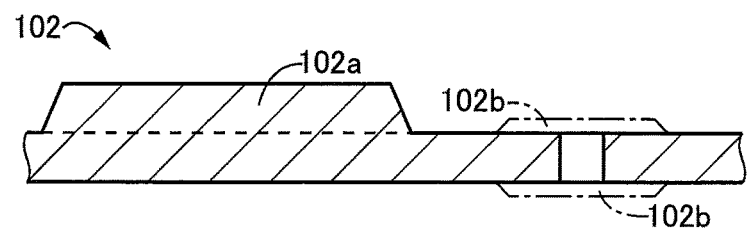
FIG. 8 is a cross sectional view taken in the direction of arrows VIII-VIII in FIG. 7.

As also shown in FIG. 2, the first and second longitudinal plate members 18 and 20 have respective thick-walled portions 18c and 20c formed by press-forming operations on their end portions on the side of the leaf spring device 12. The thick-walled portions 18c and 20c have a thickness larger than a thickness T of the other portions. It is noted that the above-indicated thick-walled portions 18c and 20c are formed to reduce vibrations (noises) around the suspension 10. It is also noted that the shackle 14 of the present embodiment using the above-described first and second longitudinal plate members 18 and 20 has substantially the same effect of damping noises and vibrations during running of the vehicle, as a shackle using a longitudinal plate member 100 having a thick-walled portion 100a formed by welding as shown in FIG. 6, and a shackle using a longitudinal plate member 102 having a thick-walled portion 102a formed by casting as shown in FIGS. 7 and 8. This noise and vibration damping effect during running of the vehicle was confirmed by an actual running evaluation test on a prototype vehicle, for example.

The shackle 14 having the structure described above is pivoted about the first axis C1 according to variations of effective longitudinal dimensions of the leaf springs 12a, 12b and 12c of the leaf spring device 12 due to their deflection during running of the vehicle, for instance.

Figure 3:
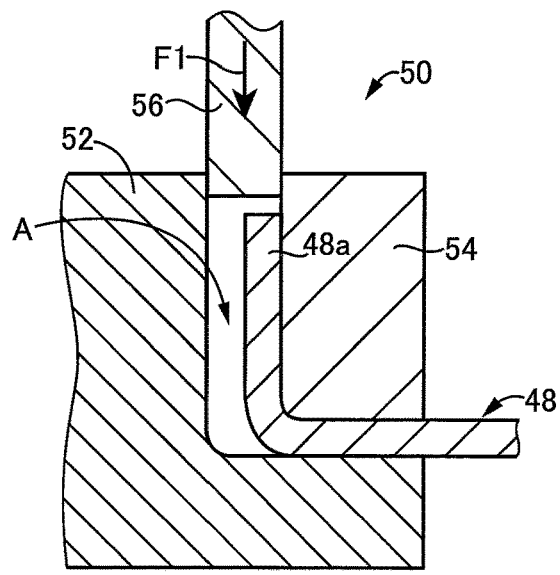
FIG. 3 is a view showing a process of forming a thick-walled portion of the longitudinal plate member provided in the shackle of FIG. 2, by a press-forming operation.
Figure 3:
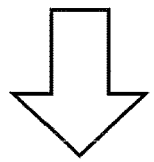
Figure 3:
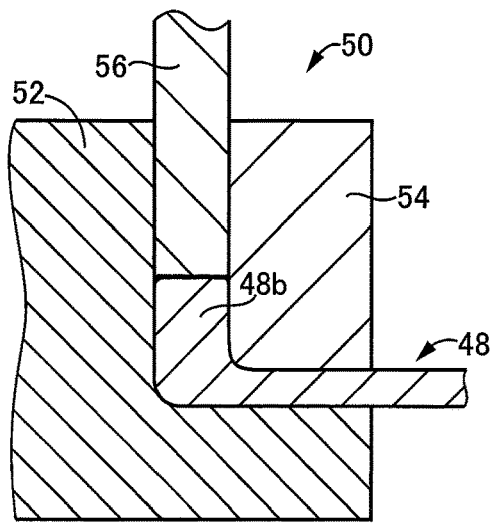

Referring to FIG. 3, there will be described a process of forming the above-described thick-walled portions 18c and 20c of the first and second longitudinal plate members 18 and 20, by press-forming operations. Each of the first and second longitudinal plate members 18 and 20 is formed from a plate member 48 in the form of an elongate plate, by bending an end portion of the plate member 48 as shown in FIG. 3.

A bent portion 48a formed as one end portion of the above-indicated plate member 48 as a result of the bending operation is further subjected to a press-forming operation by a pressing machine 50, as shown in FIG. 3, whereby the bent portion 48a is transformed into a thick-walled portion 48b. It is noted that this thick-walled portion 48b corresponds to each of the thick-walled portions 18c and 20c of the first and second longitudinal plate members 18 and 20.

Figure 4:
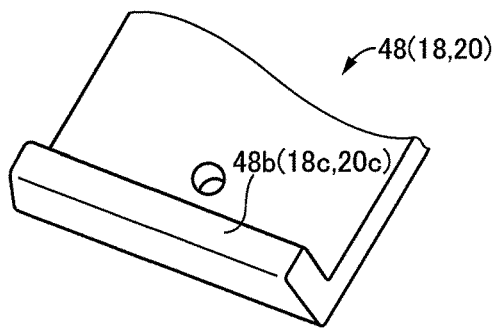
FIG. 4 is a perspective view showing the thick-walled portion formed by the process of FIG. 3.

The pressing machine 50 indicated above is provided with a first die 52 and a second die 54 for holding the bent portion 48a of the plate member 48, and a pressing die (punch) 56 which is moved within a thick-walled portion forming space A defined by the first and second dies 52 and 54, in a direction of an arrow F1. In the thus constructed pressing machine 50, the pressing die 56 is moved in the direction of the arrow F1 to press the bent portion 48a of the plate member 48, that is, the end portion of the plate member 48, in the direction of plane of this end portion, so that the bent portion 48a of the plate member 48 is transformed into the thick-walled portion 48b, as shown in FIG. 4.

As described above, the shackle 14 of the leaf spring device 12 according to the present embodiment is configured such that the end portions of the first and second longitudinal plate members 18 and 20 on the side of the leaf spring device 12 are provided with the respective thick-walled portions 18c and 20c, each of which is formed with the thickness larger than the thickness T of the other portion of the longitudinal plate member 18, 20, by the press-forming operation to press the end portion of the longitudinal plate member 18, 20, namely, the end portion of the plate member 48, in the direction of plane of this end portion. Accordingly, the first and second longitudinal plate members 18 and 20 having the thick-walled portions 18c and 20c can be manufactured at a reduced cost than in the prior art, since the thick-walled portions 18c and 20c are formed by the press-forming operations at a comparatively lower cost of manufacture, rather than by the comparatively costly welding or casting operation, for example.

Another embodiment of this invention will be described in detail by reference to the drawings. In the following description, the same reference signs will be used to identify the corresponding elements, which will not be described redundantly.

Second Embodiment

According to the shackle 14 in the above-described embodiment, the thick-walled portions 18c and 20c of the first and second longitudinal plate members 18 and 20 are formed by the press-forming operations by the pressing machine 50 to transform the bent portion 48a of the plate member 48 into the thick-walled portion 48b. The present embodiment is different from the preceding embodiment in that an end portion 58a of a plate member 58 in the form of an elongate plate is not bent, but is transformed into a thick-walled portion 58b by a pressing machine 60. In the other aspects, the present embodiment is substantially the same as the first embodiment.

Figure 5:
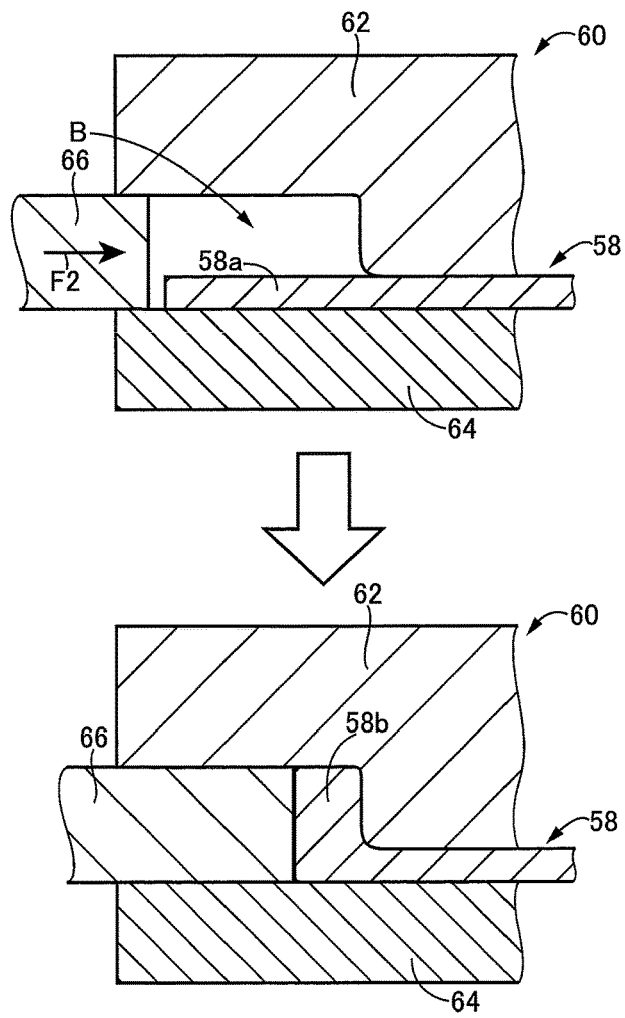
FIG. 5 is a view showing a shackle according to another embodiment of the invention, wherein the thick-walled portion is formed by a process different from that of FIG. 3.

As shown in FIG. 5, the above-indicated pressing machine 60 is provided with a first die 62 and a second die 64 for holding the end portion 58a of the plate member 58, and a pressing die (punch) 66 which is moved within a thick-walled portion forming space B defined by the first and second dies 62 and 64, in a direction of an arrow F2. In the thus constructed pressing machine 60, the pressing die 66 is moved in the direction of the arrow F2 to press the end portion 58a of the plate member 58 in the direction of plane of this end portion 58a, so that the end portion 58a of the plate member 58 is transformed into the thick-walled portion 58b. It is noted that the thick-walled portion 58b of the plate member 58 corresponds to the thick-walled portions 18c and 20c of the first and second longitudinal plate members 18 and 20.

While the embodiments of this invention have been described by reference to the drawings, the invention may be embodied otherwise.

For instance, only one of the first and second longitudinal plate members 18 and 20 may be provided with the thick-walled portion 18c, 20c on the side of the leaf spring device 12, rather than the end portions of both of the first and second longitudinal plate members 18 and 20 are provided with the respective thick-walled portions 18c and 20c as in the illustrated embodiments.

It is to be understood that the present invention may be embodied with various other changes and improvements not illustrated therein, which may occur to those skilled in the art.

NOMENCLATURE OF REFERENCE SIGNS

12: Leaf spring device (vehicle leaf spring device)
14: Shackle
18: First longitudinal plate member (Longitudinal plate member)
18c: Thick-walled portion
20: Second longitudinal plate member (Longitudinal plate member)
20c: Thick-walled portion
22: First connecting device (Connecting device)
24: Second connecting device (Connecting device)
46: Attaching member (Vehicle body member)

D1: First spacing distance (Predetermined spacing distance)
D2: Second spacing distance (Predetermined spacing distance)
T: Thickness

The invention claimed is:

1. A vehicle leaf spring shackle comprising: a pair of longitudinal plate members opposed to each other; and a pair of connecting devices for connecting said pair of longitudinal plate members to each other at their opposite end portions with respective predetermined spacing distances therebetween, and wherein between said pair of longitudinal plate members, one of said pair of connecting devices is coupled to a member of a body of a vehicle while the other of said pair of connecting devices is coupled to one end portion of a leaf spring device provided to suspend the body of the vehicle,
- at least one of the end portions of said pair of longitudinal plate members on the side of said leaf spring device being configured to include a thick-walled portion formed with a thickness larger than that of the other portions of said pair of longitudinal plate members,
- said thick-walled portion being formed by a press-forming operation to press said at least one of the end portions of said longitudinal plate members on the side of said leaf spring device, in a direction perpendicular to an end plane of said end portion, and
- each of the pair of longitudinal plate members having a monolithic structure.

2. A manufacturing method of vehicle leaf spring shackle which is provided with a pair of longitudinal plate members opposed to each other, and a pair of connecting devices for connecting said pair of longitudinal plate members to each other at their opposite end portions with respective predetermined spacing distances therebetween, and wherein between said pair of longitudinal plate members, one of said pair of connecting devices is coupled to a member of a body of a vehicle while the other of said pair of connecting devices is coupled to one end portion of a leaf spring device provided to suspend the body of the vehicle, and each of the pair of longitudinal plate members has a monolithic structure,
- the manufacturing method comprising a thick-walled portion forming step in which a thick-walled portion is formed by a press-forming operation to press at least one of the end portions of said pair of longitudinal plate members on the side of said leaf spring device, in a direction perpendicular to an end plane of said at least one of the end portions such that said thick-walled portion has a thickness larger than that of the other portions of said pair of longitudinal plate members.

3. The manufacturing method of vehicle leaf spring shackle according to claim 2, further comprising
- a bending step in which at least one of the end portions of said pair of longitudinal plate members on the side of said leaf spring device is bent by bending operation with regard to a longitudinal direction of said pair of longitudinal plate members, and wherein,
- said thick-walled portion forming step is configured to form said thick-walled portion by pressing said at least one of the end portions of the plate member, that is bent in said bending step, in the direction perpendicular to the end plane of said at least one of the end portions using a pressing die of a pressing machine so as to transform said at least one of the end portions into said thick-walled portion.

4. The manufacturing method of vehicle leaf spring shackle according to claim 2, wherein
- said thick-walled portion forming step is configured to form said thick-walled portion by pressing said at least one of the end portions of the plate member in the direction perpendicular to the end plane of said at least one of the end portions using a pressing die of a pressing machine so as to transform said plate member into said thick-walled portion.

* * * * *